United States Patent Office 3,432,878
Patented Mar. 18, 1969

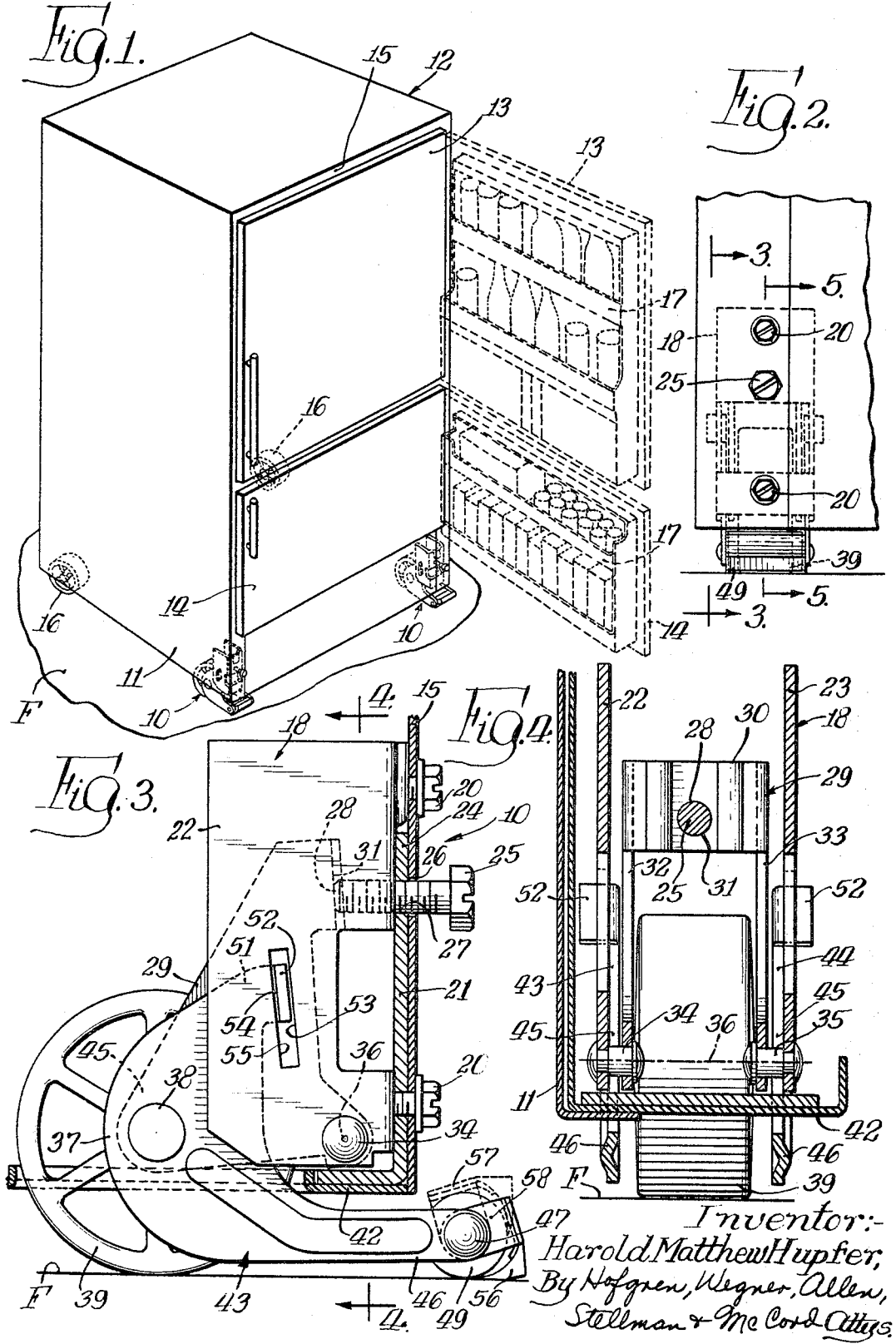

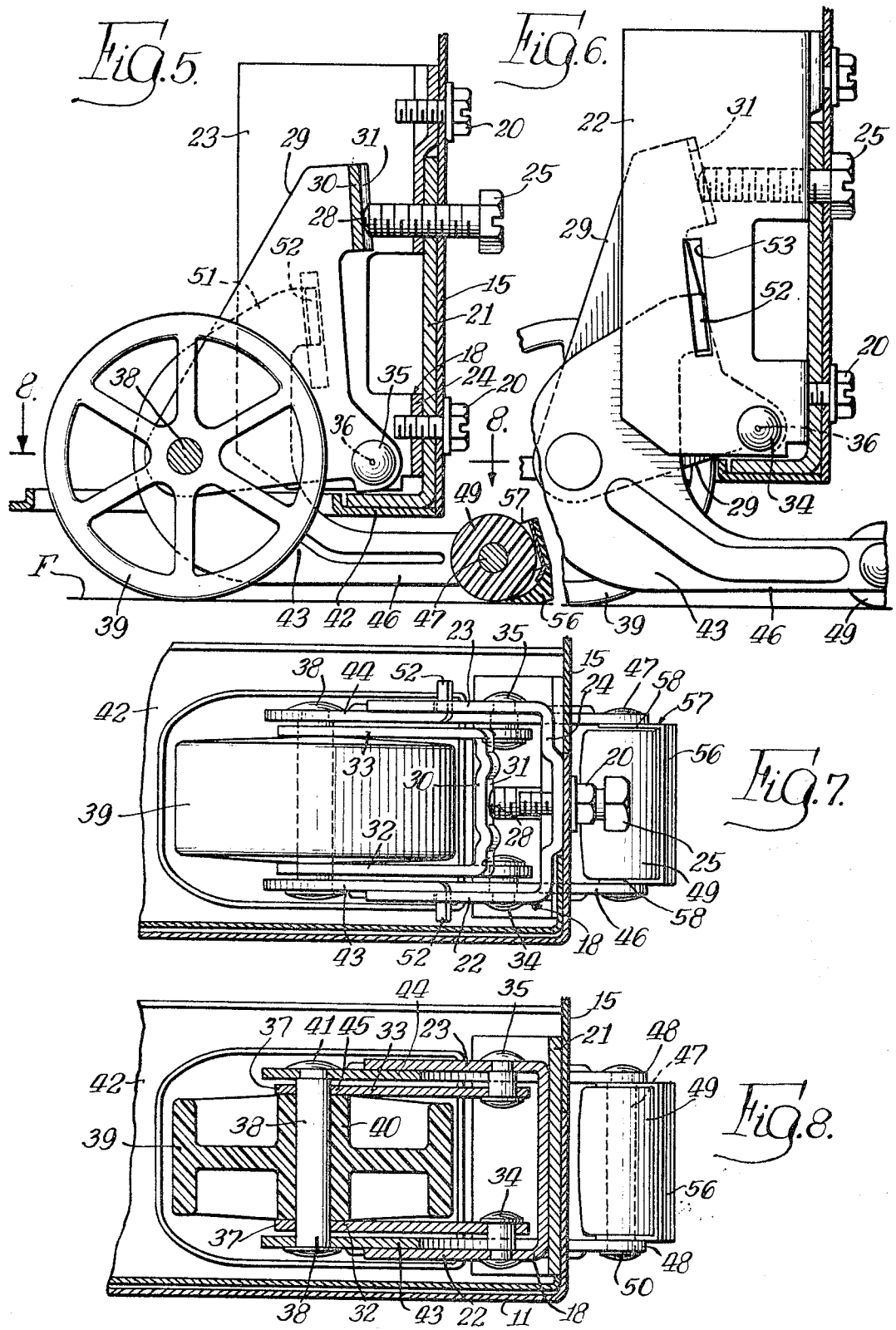

3,432,878
ADJUSTABLE CASTER WITH ANTITIP DEVICE
Harold Matthew Hupfer, Evansville, Ind., assignor to
Whirlpool Corporation, a corporation of Delaware
Filed Apr. 3, 1967, Ser. No. 627,747
U.S. Cl. 16—32      12 Claims
Int. Cl. B60b *33/04*

ABSTRACT OF THE DISCLOSURE

A caster for use with refrigerators and the like. The caster includes an antitip device for precluding forward tipping of the refrigerator cabinet as by the opening of a heavily loaded door. The caster further is provided with brake means, and adjustment means for vertically adjusting the caster to engage a subjacent surface.

---

This invention relates to casters and in particular to adjustable casters for use with refrigerators and the like.

To permit movement of relatively heavy cabinet structures such as refrigerator cabinet structures, it is desirable to mount the cabinet on suitable casters. A problem arises in the use of conventional casters for this purpose in that quite often the subjacent floor surface is uneven and the several casters supporting the cabinet may have non-uniform engagement with the floor. Further, where the casters are used in conjunction with refrigerators having shelf-type doors, the substantial weight of the food products and the like carried by the door may cause the cabinet to tip forwardly when the door is swung to the open position. This latter problem is aggravated where the refrigerator comprises a refrigerator-freezer combination with the relatively heavy door disposed at the top of the cabinet. The use of conventional casters further aggravates the problem because the casters are usually disposed somewhat rearwardly of the front face of the cabinet, thus providing a somewhat increased moment arm causing the cabinet to be tipped more readily by the opened door.

The present invention comprehends an improved caster structure eliminating the disadvantages of the above discussed conventional caster structures in a novel and simple manner. More specifically, the present invention comprehends an improved caster structure including means for effectively resisting such undesirable tipping and providing improved adjusted engagement by the respective casters with the floor notwithstanding unevenness of the floor on which the cabinet is placed.

Thus, a principal feature of the present invention is the provision of a new and improved caster structure.

Another feature of the invention is the provision of such a caster structure having new and improved antitip means.

A further feature of the invention is the provision of such a caster structure having new and improved means for vertically adjusting the caster relative to the cabinet on which it is mounted to thereby permit leveling of the cabinet when the supporting base for the cabinet is not level.

A still further feature of the invention is the provision of such a caster structure having new and improved means including a support roller and an antitip roller spaced horizontally apart and means for maintaining the height relationship between the rollers so as to effectively maintain each of the rollers in engagement with the subjacent floor surface.

A further feature of the invention is the provision of such a caster structure having new and improved means for selectively preventing movement of the caster structure along the floor surface.

Other features and advantages of the invention will be apparent from the following description taken in connection with the accompanying drawings wherein:

FIGURE 1 is a perspective view of a refrigerator provided with caster structures embodying the invention, with the doors of the refrigerator shown in an open position in broken lines;

FIGURE 2 is a fragmentary front elevation of the lower left-hand corner of the refrigerator cabinet provided with one of said caster structures;

FIGURE 3 is a fragmentary enlarged vertical section thereof taken substantially along the line 3—3 of FIGURE 2;

FIGURE 4 is a fragmentary vertical section taken substantially along the line 4—4 of FIGURE 3;

FIGURE 5 is a fragmentary enlarged vertical section taken substantially along the line 5—5 of FIGURE 2;

FIGURE 6 is a fragmentary enlarged vertical section similar to that of FIGURE 5, but with the caster structure adjusted for maximum height adjustment downwardly from the refrigerator cabinet;

FIGURE 7 is a top plan view of the caster structure, with portions of the associated refrigerator cabinet shown in horizontal section; and FIGURE 8 is a horizontal section taken substantially along the line 8—8 of FIGURE 5.

In the exemplary embodiment of the invention as disclosed in the drawing, a pair of caster structures generally designated 10 are mounted on the bottom portion 11 of a cabinet 12, herein a refrigerator-freezer cabinet. Cabinet 12 herein is provided with an upper refrigerator compartment door 13 and a lower freezer compartment door 14 which as shown in FIGURE 1 may be swung to a forwardly open position from the front face 15 of the cabinet 12.

Suitable rear casters 16 may be provided on the cabinet 12 for cooperation with the casters 10 to support the cabinet on a subjacent floor surface F. As shown, the doors 13 and 14 may be provided with shelves 17 for carrying articles to be refrigerated and thus when swung to the open position illustrated in FIGURE 1 provide a relatively heavy weight having a center of gravity spaced forwardly of the front cabinet surface 15 and thereby providing a moment tending to tip the cabinet 12 forwardly about the casters 10. The invention, however, comprehends an improved caster construction effectively resisting such tipping tendency.

Each of the casters 10 is similar and thus in describing the invention detailed description of the left-hand caster 10 will be given, it being understood that the description applies equally to the right-hand caster 10. More specifically (each caster 10 includes, as viewed in FIGURES 7 and 8, a U-shaped mounting bracket 18 which may be secured to the rear of the front wall 15 of cabinet 12 by suitable means such as screws 20, there being an L-shaped cabinet plate 21 disposed between bracket 18 and wall 15 as best seen in FIGURE 3. As best seen in FIGURE 7, the bracket 18 includes a left leg 22, a right leg 23, and a bight 24 engaged by screws 20. An adjustment screw 25 extends freely through an opening 26 in front wall 15 and is threaded through a threaded opening 27 in bracket bight 24 to have its inner end 28 disposed rearwardly of the bight intermediate the legs 22 and 23 of the bracket 18.

As shown in FIGURE 4, a yoke carrier 29 is disposed between the legs 22 and 23 of bracket 18 and includes a web 30 defining a bearing surface 31 against which screw end 28 normally abuts. The carrier 29 includes a left leg 32 and a right leg 33, the left leg being pivotally carried on leg 22 of bracket 18 by a first pivot 34 and on right leg 23 of bracket 18 by a second pivot 35 coaxially of pivot 34, the common axis 36 being generally horizontal as shown in FIGURE 4.

Each of legs 32 and 33 of carrier 29 further includes a rear portion 37, and an axle 38 extends therebetween parallel to axis 36, i.e. substantially horizontally. A caster roller or wheel, 39 is rotatably mounted on the axle 38, the hub 40 of which has an axial length comparable to the spacing between the carrier legs 32 and 33, thereby retaining the wheel against axial displacement on the axle. The wheel may be formed of a suitable material such as plastic. The axle 38 may be secured in place after the wheel is installed thereon by suitable means such as rivet 41.

The disposition of the wheel 39 relative to the bottom wall 42 of the cabinet 12 may be adjuted by pivoting the carrier 29 about the axis 36 as illustrated in FIGURES 3, 5 and 6. Such adjustment is effected by the adjustment of screw 25 to position the wheel downwardly by an inward adjustment of the screw, as shown in FIGURE 6, and upwardly by an outward threading of the screw, as illustrated in FIGURE 5. The weight of the refrigerator causes the bearing surface 31 to be urged against the inner end 28 of the screw to maintain the adjustment of the wheel in correspondence to the threaded adjustment of the screw 25.

As indicated briefly above, caster structure 10 further includes means for preventing forward tipping of the refrigerator as by the force moment occurring when the doors 13 and 14 are opened. To this end, a pair of links 43 and 44 is provided, one each on the opposite sides of carrier 29. Each link includes a first portion 45 mounted on axle 38 of carrier 29 for pivotal movement of the link thereabout. Each link, as best seen in FIGURE 3, further includes a first arm 46 extending forwardly from portion 45 to subjacent the bottom wall 42 of the cabinet and forwardly of the front face 15. An axle 47 is carried between the front ends 48 of the arms 46 of links 43 and 44, as shown in FIGURE 8, and carries a second roller, or wheel, 49 for rolling movement about a substantially horizontal axis parallel to axis 36. The axle 47 may be secured to the links by suitable means such as rivet 50.

Each link 43 and 44 further includes a second arm 51 extending from portion 45 forwardly and upwardly and having at its forward end an outturned flange 52 slidably received in a corresponding vertically elongated slot 53 in the adjacent leg 22, or 23, of the mounting bracket 18. Thus, flange 52 defines a rearwardly facing, vertically elongated surface 54, and slot 53 defines a forwardly facing, vertically elongated slide surface 55 for guiding surface 54 in a substantially vertical path as axle 38 is swung in an arcuate path about the axis 36 as a result of the adjustment of screw 25. With flange 52 confined to movement in a substantially vertical path, it will be seen that links 43 and 44 will be caused to pivot about axle 38 in a direction opposite to the pivotal movement of yoke 29 about axis 36. The relative pivotal movement between yoke 29 and links 43 and 44 is coordinated so that the axles 38 and 47 maintain a fixed height relationship wherein the bottoms of wheels 39 and 49 are in a common horizontal plane. Thus, wheel 49 effectively comprises a forward extension of wheel 39 effectively resisting forward tipping of the cabinet 12 by providing a forward fulcrum forwardly of the front face 15 of the cabinet, thereby substantially decreasing the moment arm and permitting more of the weight of the cabinet to be rearwardly of the fulcrum to counterbalance the weight of the doors in the open position.

As best seen in FIGURES 3, 5 and 7, a friction brake element 56 is carried on a yoke 57 having legs 58 pivotally mounted on the axle 47 to be swung from a retracted position (shown in broken lines in FIGURE 3) wherein the friction element 56 is spaced above the plane of the floor F for free rolling movement of the wheels 39 and 49, and a snubbing position, as shown in full lines in FIGURE 3, wherein the element 56 frictionally engages the floor surface F and effectively becomes a wedge to preclude rolling movement of the wheels and thereby hold the cabinet 12 against movement along the floor.

Thus, caster structure 10 comprises an improved vertically adjustable caster structure having improved means for preventing forward tipping of the cabinet 12. In use, the user positions the cabinet in the desired location on floor F by rolling the cabinet on the casters 10 and 16, the brake means defined by friction element 56 being in the released upper position during such movement. The brake is then moved into the lower floor engaging position to retain the cabinet in the desired position on the floor. The casters 10 may be individually adjusted vertically to level the associated cabinet and to assure solid, firm contact of each with the floor notwithstanding unevenness therein. Such adjustment is effected simply by threaded adjustment of the screws 25 as by a wrench or screwdriver to pivot the carrier 29 on the mounting bracket 18 about axis 36. As discussed above, such pivoting movement of the carrier effects a vertical adjustment in the disposition of wheels 39 and 49, with the links 43 and 44 maintaining the wheels in the preselected horizontal relationship wherein the plane defining the bottom of the wheels is maintained substantially horizontal at all times. The casters 10 are readily mounted on the cabinet wall 15 and are simple and economical of construction. The slide control effected by the links 43 and 44 is substantially foolproof and maintenance free, while yet permitting facilitated adjustment of the height of the wheels 39 and 49. The mechanism of the casters is recessed behind the front wall 15, while yet the adjustment thereof may be readily effected by means of the screw 25 extending forwardly through front wall 15.

The embodiments of the invention in which an exclusive property or privilege is claimed are defined as follows:

1. A height adjustable caster for a refrigerator comprising:
   a U-shaped mounting bracket having spaced apart slide means thereon, said mounting bracket being fixedly secured to said refrigerator;
   a yoke pivotally connected to said U-shaped bracket, said yoke having a web portion;
   a first roller having an axle rotatably mounted in said yoke;
   a pair of links pivotally mounted on opposite ends of said axle each link having first and second arms, said first arms extending away from said axle toward the front of said refrigerator, said second arms each having an outwardly extending flange thereon, said flanges cooperating with said slide means to limit the pivotal movement of said links and to cause a point on each of said first arms to maintain a fixed height relationship with said axle;
   a second roller rotatably mounted between said first arms at said point; and
   adjustment means cooperating with the web portion of said yoke for pivoting said yoke to thereby adjust the height of said first roller.

2. A vertically adjustable caster structure comprising:
   a mounting bracket;
   slide means fixedly associated with said bracket;
   a carrier pivotally connected to said bracket for pivotal movement about a first horizontal axis, said carrier having a bearing portion spaced from said axis;
   a first roller mounted on said carrier for rotation about a second axis parallel to said first axis;
   link means mounted on said carrier for pivotal movement about said second axis and having first and second portions extending away from said second axis;
   a second roller mounted on said first portion of said link means for rotation about a third axis parallel to said first and second axes, and disposed to have the bottom of said rollers define a substantially horizontal reference plane;
   means on said second portion of the link means cooperating with said slide means to limit the pivotal movement of said link means and cause said plane to be maintained substantially horizontal at all times; and adjustment means cooperating with said bearing portion of said carrier for pivoting said carrier to adjust the height of said plane with respect to said mounting bracket.

3. The adjustable caster structure of claim 2 wherein said slide means comprises means defining a slide surface on said bracket.

4. The adjustable caster structure of claim 2 wherein said bracket comprises a U-shaped bracket.

5. The adjustable caster structure of claim 2 wherein said carrier comprises a yoke having a web portion defining said bearing portion of the carrier.

6. The adjustable caster structure of claim 2 wherein said link means comprises a pair of links, each of said links being respectively mounted on opposite ends of said axle.

7. The adjustable caster structure of claim 2 wherein said first and second portions of the link means comprise arm portions.

8. The adjustable caster structure of claim 2 wherein said means on the second portion of the link means cooperating with said slide means comprises a turned flange thereon.

9. The adjustable caster structure of claim 2 wherein said adjustment means comprises a threaded element and means fixedly associated with said bracket threadedly carrying said element for selective threaded advance and withdrawal relative to said bearing portion.

10. The adjustable caster structure of claim 2 wherein said second roller has a diameter smaller than that of said first roller and said slide means is arranged to cause said second and third axes to maintain a preselected height relationship.

11. The adjustable caster structure of claim 2 including means movably carried by said first link means portion for selective disposition subjacent said second roller to snub rolling of said rollers on a subjacent surface.

12. The adjustable caster structure of claim 2 including a brake comprising:
a snubber element having a friction portion; and
means carrying said friction portion for selective retracted disposition above the level of the bottom of said second roller and braking disposition at the level of the bottom of said second roller.

References Cited

UNITED STATES PATENTS

| 1,835,144 | 12/1931 | Cleaveland | 16—34 |
| 2,033,207 | 3/1936 | Schultz | 16—32 |
| 2,425,675 | 8/1947 | Graff | 16—19 |
| 2,853,732 | 9/1958 | Matter | 16—32 |

DONALD A. GRIFFIN, *Primary Examiner.*